United States Patent [19]

Heinen

[11] Patent Number: 5,400,419
[45] Date of Patent: Mar. 21, 1995

[54] BIDIRECTIONAL OPTICAL TRANSMISSION AND RECEPTION MODULE

[75] Inventor: Jochen Heinen, Haar, Germany

[73] Assignee: Siemens Aktiengesellschaft, Munich, Germany

[21] Appl. No.: 161,666

[22] Filed: Dec. 3, 1993

[30] Foreign Application Priority Data

Dec. 3, 1992 [DE] Germany ............... 42 40 737.0

[51] Int. Cl.⁶ ............................................. G02B 6/12
[52] U.S. Cl. ....................................... 385/14; 359/114; 359/127; 359/154; 385/24
[58] Field of Search .................... 385/14, 24, 129–132; 359/113, 114, 127, 133, 138, 152, 154, 159, 168–170

[56] References Cited

U.S. PATENT DOCUMENTS

| | | | |
|---|---|---|---|
| 3,716,804 | 2/1973 | Groschwitz | 385/14 |
| 4,730,330 | 3/1988 | Plihal et al. | 372/50 |
| 4,732,446 | 3/1988 | Gipson et al. | 385/24 |
| 4,750,799 | 6/1988 | Kawachi et al. | 385/14 |
| 4,776,660 | 10/1988 | Mahlein et al. | 385/44 |
| 4,871,224 | 10/1989 | Karstensen et al. | 385/14 |
| 4,969,712 | 11/1990 | Westwood et al. | 385/14 |
| 5,061,027 | 10/1991 | Richard | 385/14 |

FOREIGN PATENT DOCUMENTS

| | | |
|---|---|---|
| 3731311 | 3/1989 | Germany . |
| 3809396 | 10/1989 | Germany . |
| 3811723 | 10/1989 | Germany . |
| 3831839 | 3/1990 | Germany . |
| 2615780 | 4/1991 | Germany . |
| 4136893 | 5/1993 | Germany . |

OTHER PUBLICATIONS

Patent Abstract of Japan, vol. 11, No. 337 (p. 633), 5 Nov. 1987 and Pat. A 62121409 (Hitachi).
Patent Abstract of Japan, vol. 16, No. 117 (p. 1328), 24 Mar. 1992 and Pat. A 3287207 (Hitachi).

Primary Examiner—John D. Lee
Attorney, Agent, or Firm—Hill, Steadman & Simpson

[57] ABSTRACT

A bidirectional optical transmission and reception module includes a substrate having one surface provided with waveguides and mirrors for deflecting radiation into the substrate and on an opposite surface of the substrate is provided a laser diode serving as a transmitter, a photodiode as a receiver, and a terminal for an optical fiber, each opposite the mirrors on the waveguides. Optical connections between the optical fiber and the laser diode and between the optical fiber and the photodiode are carried out through the substrate and via the waveguides. An optical coupler is also provided between the waveguides.

8 Claims, 2 Drawing Sheets

BIDIRECTIONAL OPTICAL TRANSMISSION AND RECEPTION MODULE

BACKGROUND OF THE INVENTION

1. Field of the Invention

The present invention is related generally to an apparatus for bidirectional optical transmission and reception for transmitting and receiving data with an optical fiber.

2. Description of the Related Art

In optoelectronic communications technology it is expedient to combine transmission modules and reception modules so that the same optical fiber may be used for transmitting and for receiving signals. Such combined modules are known as bidirectional modules. Bidirectional modules include at least one laser diode which serves as a transmitter and a photodiode which serves as a receiver. The transmitter and receiver are arranged so that both are optically connected to the optical fiber terminal by suitable reflecting and/or filtering intermediate elements. The assembly of such bidirectional modules requires a substantial technological outlay.

SUMMARY OF THE INVENTION

An object of the present invention is to provide a bidirectional optical transmission and reception apparatus which is simple to manufacture and may potentially also be combined with additional transmission, reception or drive components.

This and other objects and advantages of the invention are achieved in an arrangement for bidirectional optical transmission and reception including a substrate which is transmissive to optical radiation, at least two strip shaped waveguides, a terminal for an external waveguide, and at least one laser diode and a photodiode. The waveguides are arranged on the surface of the substrate in parallel to this surface and the ends of the waveguide are provided with mirrors which are aligned so that radiation is reflected between the waveguides and the substrate. The terminal, the laser diode and the photodiode are arranged on an opposite surface of the substrate and are aligned so that the radiation proceeding from the external waveguide or from the laser diode proceeds through the substrate to one of the mirrors at the ends of the waveguides so that radiation coming from the waveguide is reflected by the mirrors to the photodiode. Further, at least one coupler is provided between the two waveguides such that the terminal is optically connected to the laser diode and the photodiode.

Further developments of the invention include that an additional photodiode is provided on the substrate to serve as a monitor diode for the laser diode, the monitor diode being at the same surface of the substrate as the laser diode. A part of the radiation emitted from the laser diode is reflected into the monitor diode by a mirror at the end of the waveguide. In an additional development, the laser diode and the terminal are optically connected through the same waveguide. Additionally, the photodiode and the monitor diode are connected through the same waveguide.

In a preferred embodiment, the laser diode and the photodiode are arranged on a filter layer which is applied onto the surface of the substrate. The filter layer includes filters which are arranged between the laser diode and the substrate and between the photodiode and the substrate. The filter which is arranged between the laser diode and the substrate is non-transmissive for wave lengths of radiation which are to be received by the photodiode and the filter which is arranged between the photodiode and the substrate is non-transmissive for wavelengths of radiation emitted by the laser diode.

An additional feature which may be provided is a metal layer between the laser diode and the substrate on which the laser diode and the photodiode are mounted. The metal layer is provided with openings through which the optical radiation is permitted to pass. A preferred embodiment provides that the laser diode and the photodiode are integrated in a layer sequence which is grown onto the substrate.

In the present apparatus, the beam path proceeds between the terminal of the optical fiber and the optoelectronic transmission and reception elements through a substrate on which opposite surface the radiation is deflected parallel to the substrate surface with mirrors and is guided in strip shaped waveguides. One surface of the substrate carries the various functional elements and the opposite surface of the substrate carries the strip shaped waveguides that produce the optical connections between the functional elements.

DETAILED DESCRIPTION OF THE PREFERRED EMBODIMENTS

Figure 1:
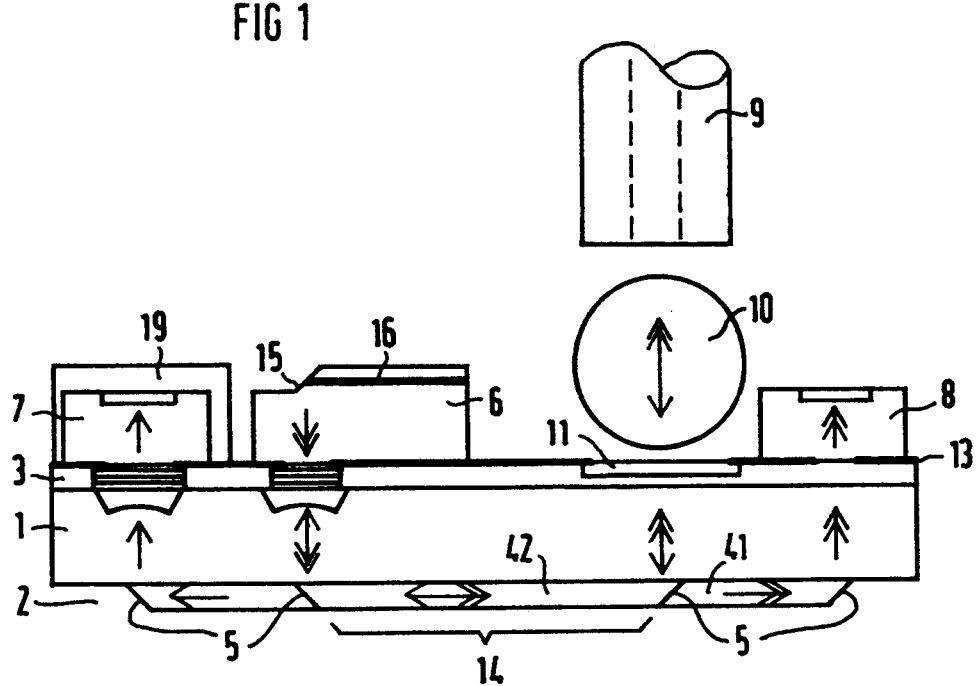
FIG. 1 is a side cross sectional view of an embodiment of a bidirectional optical transmission and reception module according to the principles of the present invention.

In FIG. 1 is shown a substrate I which is a semiconductor wafer in one embodiment or may be a plate of any material having adequate mechanical stability and optical transparency. Preferred materials for the substrate 1 include, for example, silicon, GaAs or InP. On the bottom side, with reference to FIG. 1, the substrate 1 is provided a waveguide layer 2 in which is formed strip shaped waveguides 41 and 42. The waveguide layer 2, for example, includes buried waveguides or ridge waveguides which are formed of the same semiconductor material as the substrate 1. The waveguides 41 and 42 may be produced in ways which are known by differently doped semiconductor materials having different, for example ternary or quaternary crystal composition, including GaAlAs/GaAs, InGaAsP, InGaAlAs. Dielectrics, for example doped or undoped silicon dioxide ($SiO_2$) may also be used. The ends of the waveguides 41 and 42 are provided with mirrors 5 which are at an oblique angle so that optical radiation from the substrate 1 is coupled into the waveguide 41 or 42 and optical radiation from the waveguide 41 or 42 is reflected into the substrate 1. Preferably, the mirrors 5 are inclined at approximately 45° relative to the propagation direction of the radiation in the waveguides 41 and 42. This permits light entry and exit into and out of the substrate 1.

The substrate 1 is transparent to the radiation carded in the waveguides in a direction perpendicular relative to the waveguides. The mirrors 5 provide total reflection of the radiation for deflection into and out of the substrate 1. Provided semiconductor materials are used for the substrate 1 and the waveguide layer 2, the reflection at the junction between the waveguide material and the substrate material is negligible when silicon dioxide (SiO$_2$) waveguides are used on the silicon substrate, an anti-reflection layer or an anti-reflection layer sequence may also advantageously be applied at the transition surface.

On the surface of the substrate 1 opposite the waveguides 41 and 42 is provided at least one laser diode 6 which serves as a transmitter and one photodiode 7 which serves as a receiver. A terminal for an external waveguide is also situated at this side of the substrate 1 and in the illustrated embodiment the external waveguide is an optical fiber 9. In FIG. 1, the beam path for light proceeding out of the optical fiber 9 and into the present apparatus is indicated with single arrows. The radiation emitted by the laser diode 6 is indicated in FIG. 1 with double arrows.

Figure 2:
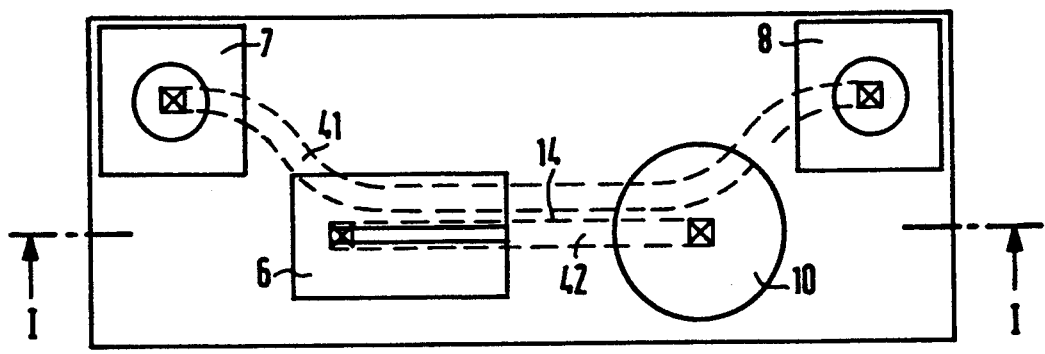
FIG. 2 is a plan view of the embodiment of FIG. 1.

The embodiment of FIG. 1 is shown in plan view in FIG. 2 with reference to FIG. 2, and may be seen that the radiation from the optical fiber 9 is deflected into the waveguide 42 where it continues. Apart from the radiation in the waveguide 42 is coupled over in an optical coupler 14 into the second waveguide 41 and is deflected toward the photodiode 7 at the end of the waveguide 41 by the mirror 5. This radiation is received in the photodiode 7 by contrast, the radiation from the laser diode 6 proceeds into the waveguide 42 and at least part of this radiation proceeds therefrom into the optical fiber 9.

When the transmission wavelength and the reception wavelength are different, fillers which are non-transmissive for the respective other wavelength can be built into the beam path preceding the laser diode 6 and preceding the photodiode 7. This prevents the wavelength to be received from reaching the photodiode 6 and prevents the wavelength being emitted by the laser diode 6 from being detected by the photodiode 7. The addition of a filler layer 3 is expedient for the use of such fillers. However, filters can also be integrated into the respective surfaces of the substrate 1.

The laser diode 6 is preferably a surface-emitting semiconductor laser which is mounted directly onto the substrate or on the filler layer 3. An edge emitting laser diode 6 having an active layer 16 and a deflecting mirror 15 is shown in FIG. I to increase the coupling efficiency and the alignment tolerance, the laser can also be provided with an integrated micro lens. Additional micro lenses 12 which are arranged at the surface of the substrate 1 preceding the laser diode 6 and preceding the photodiode 7 are also shown in FIG. 1.

Heat generated by the laser 6 is eliminated either through the substrate 1 or through the filter layer 3.

As a means for preventing optical cross talk between the laser diode 6 and the photodiode 7, the photodiode 7 is surrounded with a light impermeable material 19.

The surface of the substrate which is opposite the waveguide layer 2 is provided with a metal layer 3 which has openings through which the optical radiation may pass unimpeded. The metal layer 13 shields stray light from the substrate 1 and also provides a mounting surface for the laser diode 6 and the photo diode 7 as well as any other functional elements which may be applied onto the metal layer 13. Furthermore, the metal layer 13 forms an equipotential area that may be electrically grounded to prevent electrical crosstalk between the laser diode 6 and the photodiode A significant feature of the arrangement according to the present invention is the simple, compact structure which is provided that is composed of only a few part and which can be easily adjusted. The present apparatus can be integrated in a module housing with a simple surface mounting such as is used for infrared diodes, and can be connected to the optical fiber 9 in a known way. Further features which may be incorporated in the present apparatus include a spherical lens 10 as shown in FIG. 1 or a lens plate such as a Fresnel lens or microlenses; such lenses being provided in the region for connection of the optical fibers and being mounted on the surface of the substrate 1. In the illustration in FIG. 1 is shown an anti-reflection layer 11 that is formed in the filter layer 3 at the location for entry of the light into the substrate 1 from the optical fiber 9 through the spherical lens 10.

Figure 3:
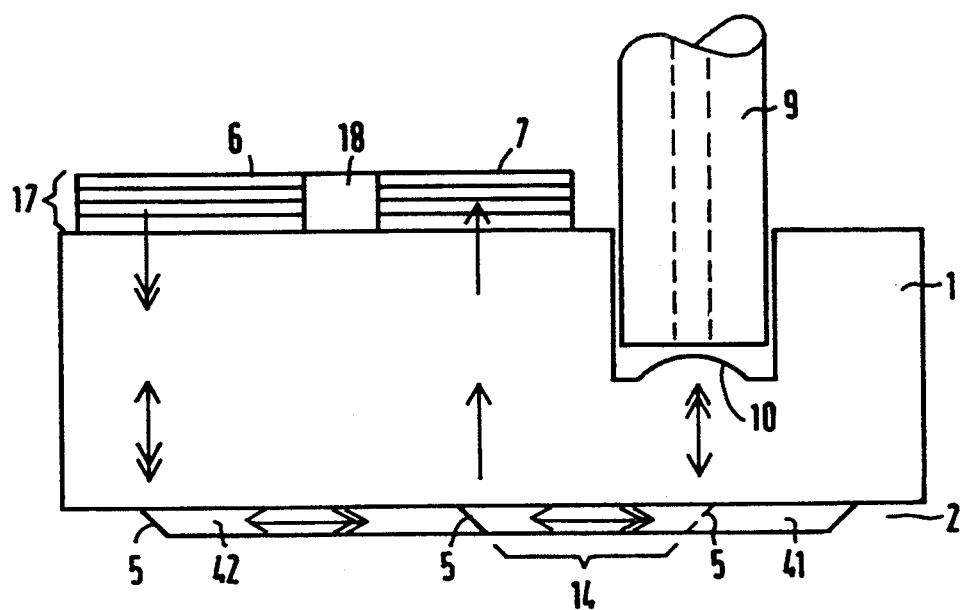
FIG. 3 is a side cross-sectional view of a second embodiment of the bidirectional module of the invention.

Referring now to FIG. 3, an arrangement is shown in which an optical fiber 9 is directly introduced into a recess in the substrate 1 and wherein an input surface is formed with an integrated lens 10' in the substrate material. This embodiment shows an alternate means for mounting the external waveguide to the apparatus. There is no limit on the way that the external waveguide may be connected to the device of the invention. In the embodiment of FIG. 1, the other parts for mounting the optical fiber 9 and the spherical lens 10 to the apparatus are not shown.

The embodiment of FIG. 3 is a simplified arrangement without a filter layer 3 and without a metal layer 13 as compared to the first embodiment. In the embodiment of FIG. 3, the laser diode 6 and the photodiode 7 are integrated in a layer sequence 17 of semiconductor material which is grown onto the surface of the substrate 1. An intermediate region 18 is provided in the layer sequence 17 between the laser diode 6 and the photodiode 7, the intermediate region 18 being electrically and optically insulating.

Figure 4:
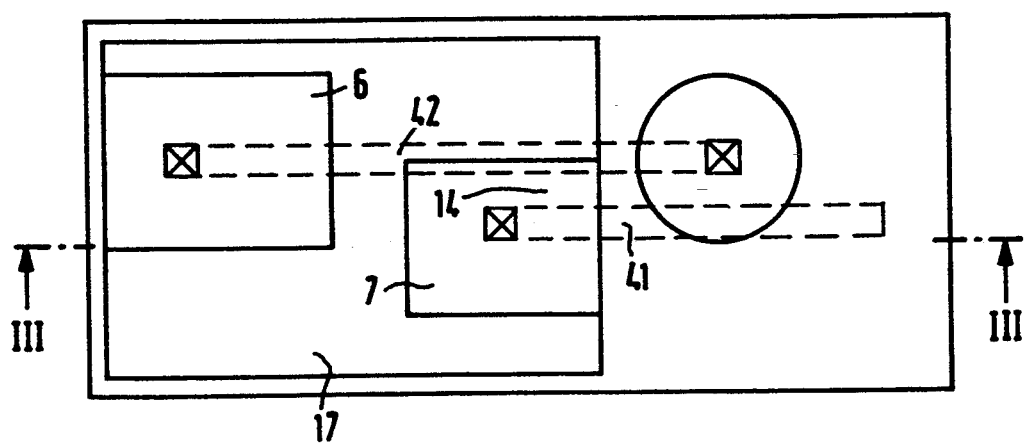
FIG. 4 is a plan view of the embodiment of FIG. 3.

In the plan view of FIG. 4 may be seen the arrangement of the strip shaped waveguides 41' and 42', which is different in the second embodiment. In particular, the beam path of the incoming radiation as indicated by single arrows and of the emitted radiation as indicated by double arrows proceeds through the waveguides 41 and 42 and is deflected by the mirrors 5. The spacing between the laser diode 6 and the photodiode 7 and the shapes of the waveguides 41 and 42 and the position of the terminal for the external waveguide is variable. The figures of the present application are intended only to illustrate that the dimensions and spacing of the components on the substrate need not be fixed.

The substrate 1' may also contain further components which are optically connected to one another via the waveguides 41 and 42. The input and output of light need not occur only with oblique mirrors 5 but, instead, may be accomplished by the use of lenses, tapers or butt coupling or leakage wave coupling of the waveguides.

A particularly advantageous development in the apparatus of the present invention provides a monitor diode 8 which serves to monitor the operation of the laser diode 6. As shown in FIG. 1, the monitor diode 8 is arranged so that part of the light emitted by the laser diode 6 is supplied to the monitor diode 8 via the waveguide 41. In FIG. 2, it may be seen that the part of the light which is coupled over into the waveguide 41 with the optical coupler 14 from the waveguide 42 which optically connects the laser diode 6 to the terminal of the optical fiber 9. This light then proceeds through the waveguide 41 into the monitor diode 8.

The embodiment of FIG. 3 contains no monitor diode 8 and the corresponding waveguide 41 is provided with a dead end.

Given connection of the optical fiber terminal 9 to the laser diode 6 and the photodiode 7, at least two waveguides are required when strip shaped waveguides having two ends are used. Coupling of these waveguides can ensue through the well known waveguide couplers. It is also possible that two waveguides may be brought together into a common strip with a Y-shaped branching, for example, which serves as an optical coupler according to the present invention. This type of coupling may be utilized in the embodiment of FIGS. 3 and 4 by changing the dead end of the waveguide 41 to discharge into the waveguide 42. A simple arrangement is then provided which has optimally few waveguides to be coupled to one another.

A direct optical connection of the laser diode 6 to the terminal 9 through a common waveguide 42 provides advantages for efficient input of the radiation emitted by the laser diodes 6 with an optimally high transmission power into the optical fiber 9. When a monitor diode 8 is provided, it is advantageous that the two remaining components, namely the photodiode 7 and the monitor diode 8, are again provided on a common waveguide 41 which is coupled to the other waveguide 42. Alternately, the photodiode 7 and the terminal for the external waveguide can be optically connected to one another on a common waveguide. The light which comes in from the laser diode 6 is deflected in a further waveguide and is supplied to the waveguide which is optically connected to the optical fiber. This arrangement can be advantageous when the incoming radiation does not have sufficient power for an adequate and efficient over coupling through the optical coupler.

The present invention is suitable for operating in a mode wherein the wavelengths of the received and of the emitted radiation are not clearly different from one another or in a mode wherein the transmission and reception does not occur simultaneously but is instead in a so called ping-pong mode.

The present arrangement can be expanded to include a plurality of reception and transmission elements. Further functional elements such as, for example, amplifiers or a driver circuits can also be mounted on or integrated into or on the substrate 1 in common with the laser diode 6 and the photodiode 7 of the exemplary embodiment. A particular advantage for the present arrangement is that one surface of the substrate remains exclusively provided for waveguides and all of the other elements are simply grown onto or mounted on the opposite surface. Other devices which serve the purposes of filtering, focusing, or shielding of radiation can easily be integrated in or onto the substrate.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An apparatus for bidirectional optical transmission and reception, comprising:
    a substrate of a material which is transmissive to optical radiation, said substrate having first and second surfaces;
    at least two strip-shaped waveguides on said second surface of said substrate, said at least two strip-shaped waveguides being arranged to provide optical waveguidance substantially parallel to said second surface of said substrate;
    mirrors at ends of said at least two strip-shaped waveguides, said mirrors being angled to reflect optical radiation between said at least two strip-shaped waveguides and said substrate;
    a terminal connectible to an external waveguide and mounted on said first surface of said substrate, said terminal being aligned such that radiation proceeding from said external waveguide proceeds through said substrate to one of said mirrors on one of said at least two strip-shaped waveguides;
    at least one laser diode on said first surface of said substrate and aligned such that radiation proceeding from said at least one laser diode proceeds through said substrate to one of said mirrors on one of said at least two strip-shaped waveguides;
    a photodiode on said first surface of said substrate and aligned to receive optical radiation reflected by one of said mirrors from one of said at least two strip-shaped waveguides; and
    at least one optical coupler between said at least two strip-shaped waveguides to provide optical communication between said terminal and said at least one laser diode and said photodiode.

2. An apparatus as claimed in claim 1, further comprising:
    a further photodiode on said first surface of said substrate and arranged to receive optical radiation from one of said mirrors on one of said at least two strip-shaped waveguides which optical radiation has been emitted by said at least one laser diode and thereby serve as a monitor diode.

3. An apparatus as claimed in claim 2, wherein said photodiode and said further photodiode are optically connected through a same one of said at least two strip-shaped waveguides.

4. An apparatus as claimed in claim 1, wherein said at least one laser diode and said terminal are optically connected through a same one of said at least two strip-shaped waveguides:

5. An apparatus as claimed in claim 1, further comprising:
    a filter layer on said first surface of said substrate, said filter layer including a first filter between said at least one laser diode and said substrate and a second filter between said photodiode and said substrate, said first filter being non-transmissive for a wavelength of radiation to be received by said photodiode, and said second filter being non-transmissive for a wavelength of optical radiation emitted by said at least one laser diode.

6. An apparatus as claimed in claim 1, further comprising:
    a metal layer on said first surface of said substrate between said at least one laser diode and said substrate, said metal layer defining openings to permit optical radiation to pass therethrough unimpeded between said at least one laser diode and said substrate.

7. An apparatus as claimed in claim 1, wherein said at least one laser diode and said photodiode are integrated in a layer sequence grown onto said substrate.

8. A bidirectional optical module for connection to a terminal end of an optical fiber, comprising:
- a substrate of a semiconductor material which is transparent to optical radiation carried on the optical fiber, said substrate having a first surface and a second surface and defining a location on said first surface for optical connection of the optical fiber;
- a laser diode on said first surface of said substrate arranged to transmit optical radiation into said substrate;
- a photodiode on said first surface of said substrate and arranged to receive radiation transmitted from said substrate;
- at least one optical waveguide on said second surface of said substrate, said at least one optical waveguide including a terminal end mirror opposite said laser diode to reflect light received through said substrate from said laser diode into said at least one waveguide, a mirror opposite said location for connecting the optical fiber to transmit optical radiation carried in the waveguide through the substrate and into the optical fiber, and a mirror at a location opposite said photodiode to reflect optical radiation carried in said waveguide through said substrate into said photodiode, wherein said at least one waveguide comprises two waveguides, and
- an optical coupler between said two waveguides to optically connect optical radiation between said two waveguides.

* * * * *